United States Patent [19]

Ku

[11] Patent Number: 5,311,780
[45] Date of Patent: May 17, 1994

[54] OIL-FILLED PRESSURE GAUGE LEAK-STOPPAGE DEVICE

[76] Inventor: Wen-Fu Ku, No. 2, Lane 58, Hu Shan Rd., Ying Ko Town, Taipei Hsien, Taiwan

[21] Appl. No.: 24,740
[22] Filed: Mar. 2, 1993
[51] Int. Cl.⁵ ............................................. G01L 7/04
[52] U.S. Cl. ................................... 73/739; 73/741; 277/102
[58] Field of Search ............... 73/743, 742, 739, 738, 73/741, 732, 733, 734, 735, 736, 737, 740; 374/203; 277/102, 123, 125

[56] References Cited

U.S. PATENT DOCUMENTS 3,335,609  8/1967  Nelson .................................. 73/739
3,874,241  4/1975  Harland et al. ..................... 73/738
4,175,444  11/1979  Harland ............................... 73/738

Primary Examiner—Donald O. Woodiel
Assistant Examiner—Joseph L. Felber

[57] ABSTRACT

Disclosed is an oil-filled pressure gauge leak-stoppage device including a rivet-like rubber gasket and a metal gasket respectively mounted on a plane on the peripheral wall of the casing around an axle hole thereof to seal the gap between the casing and the stem of the gauge, which stem being inserted out of the casing through the axle hole. A plastic gasket is directly molded on a chamfered annular groove on the bottom of the head of each gauge tie screw around its shank to seal the gap between the casing and the respective tie screw.

1 Claim, 3 Drawing Sheets

A-A

OIL-FILLED PRESSURE GAUGE LEAK-STOPPAGE DEVICE

BACKGROUND OF THE INVENTION

The present invention relates to pressure gauges, and more particularly the present invention relates to an oil-filled pressure gauge leak-stoppage device which stops the oil from leaking out of an oil-filled pressure gauge.

A variety of pressure gauges are known, and widely used for measuring the pressure of steam, water, gas, etc. FIG. 5 illustrates a pressure gauge filled with an oil, for example: glycerin, for measuring the pressure of unstable or high turbulent steam, water, gas, etc. This oil-filled pressure gauge is generally comprised of a gauge received inside a casing and having a stem extended out of the casing through an axle hole on a vertical peripheral wall thereof and sealed by a rubber gasket. As illustrated in FIGS. 6 and 7, tie screws are threaded through holes on the bottom of the casing into respective screw holes on the gauge to fix the gauge to the casing on the inside. The gaps between the casing and the tie screws are sealed by rubber gaskets. Because the vertical peripheral wall is made around a circle, the rubber gasket which seals the gap between the stem of the gauge and the casing tends to deform when the gauge is fixed in place. When deformed, gaps may occur between the stem of the gauge and the casing, through which the oil will leak out. Further, the rubber gasket which seals the gap between the casing and either tie screw may displace or deform easily when the respective tie screw was screwed tight, therefore a satisfactory sealing effect becomes not achievable.

SUMMARY OF THE INVENTION

The invention eliminates the aforesaid problems. The present invention is to make a plane on the vertical peripheral wall of the casing so that a rivet-like rubber gasket and a metal gasket can be firmly retained between the casing and the gauge without being caused to deform. Further, a plastic gasket each is respectively and directly molded on a chamfered annular groove on the bottom of the head of each tie screw around its shank to seal the gap between the casing and the respective tie screw.

DETAILED DESCRIPTION OF THE PREFERRED EMBODIMENT

Figure 1:
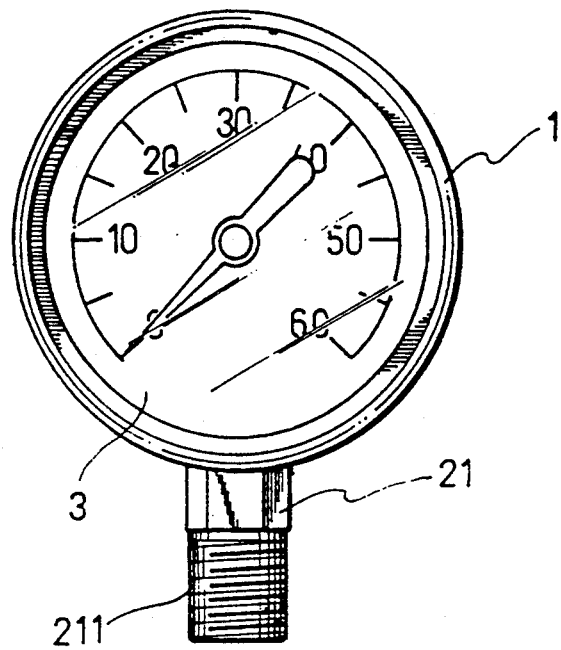
FIG. 1 is a front view of the preferred embodiment of the present invention.
Figure 2:
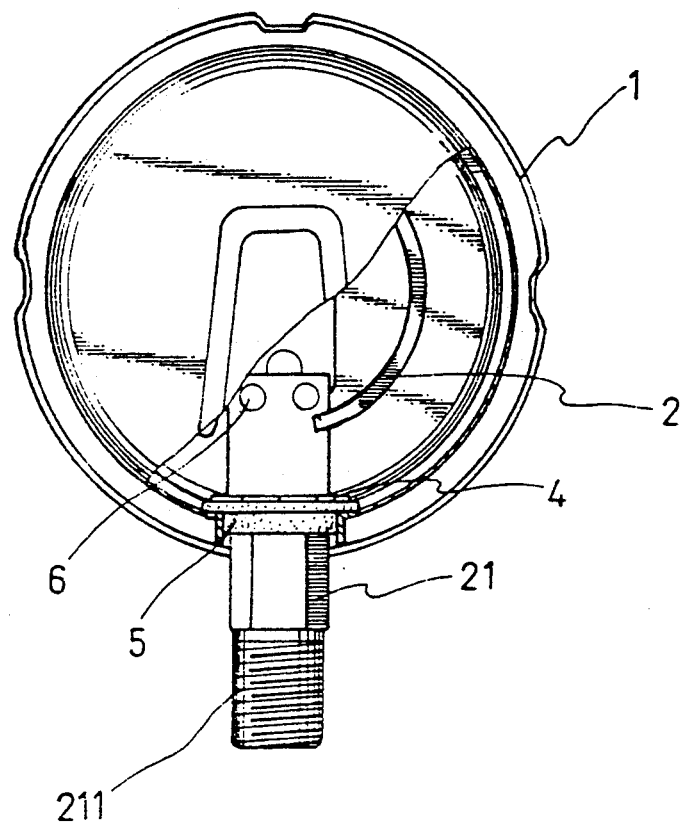
FIG. 2 is a back view with partial section thereof.
Figures 3, 3A:
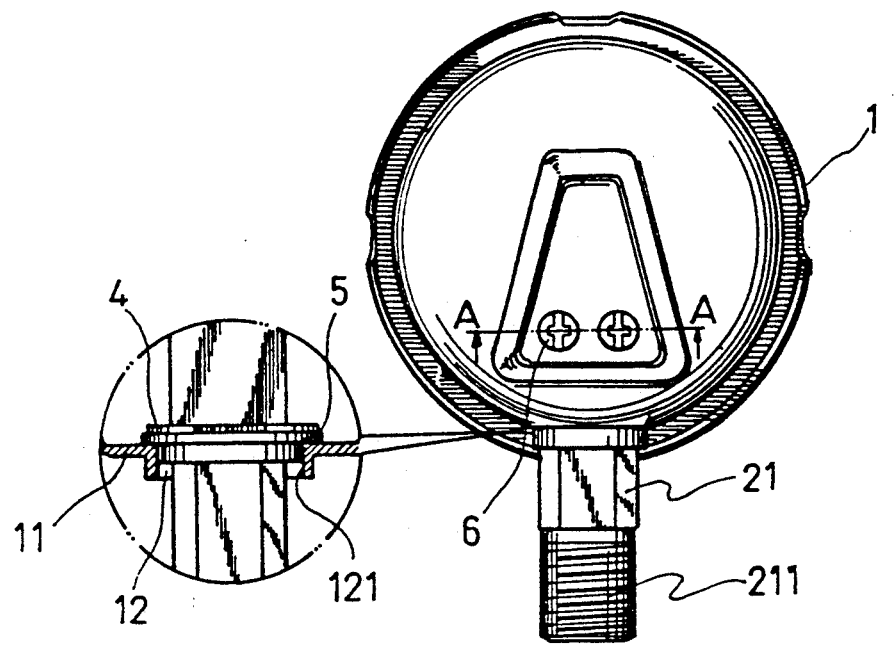
FIG. 3 and FIG. 3A illustrate the gap between the stem and the casing of the preferred embodiment sealed by a rivet-like gasket and a flat metal gasket.
Figure 4:
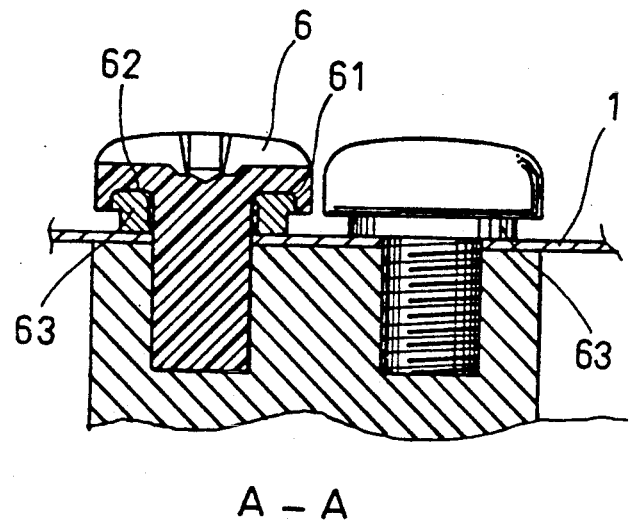
FIG. 4 is a cross section along line A—A in FIG. 3 in an enlarged scale.
Figure 5:
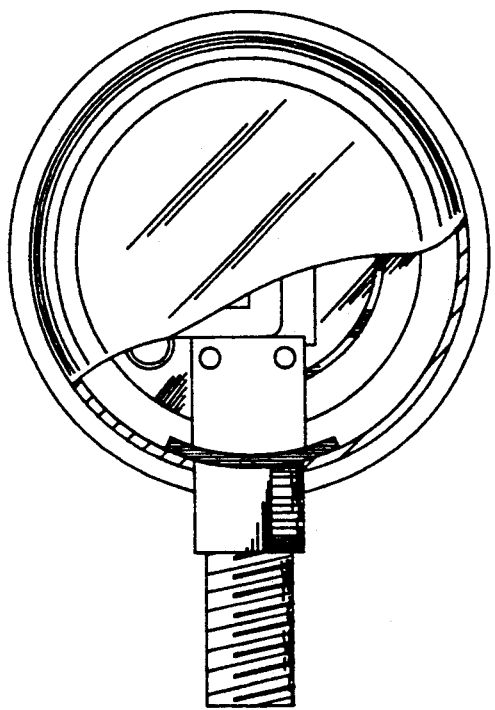
FIG. 5 is a front plan view of a oil-filled pressure gauge according to the prior art, showing the gap between the gauge and the casing sealed by a rubber gasket.
Figure 6:
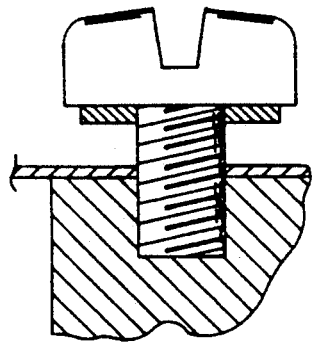
FIG. 6 illustrates a rubber gasket mounted on a tie screw to seal the gap between the tie screw and the casing of the oil-filled pressure gauge of FIG. 5.
Figure 7:
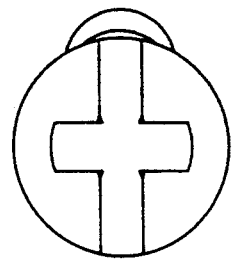
FIG. 7 is a top plan of FIG. 6, showing the rubber gasket displaced.

Referring to FIGS. 1, 2, 3 and 3A therein illustrated is an oil-filled pressure gauge made according to the present invention, which is generally comprised of a casing 1, a gauge 2, a transparent cover 3, a flat metal gasket 4, a rivet-like rubber gasket 5, and tie screws 6.

The casing 1 is made in a circular shape, having a through hole 12 through a plane 11 on a lower peripheral wall thereof. The gauge 2 comprises a stem 21 terminated to a unitary screw rod 211. The stem 21 is inserted through the through hole 12 on the casing 1 for permitting the gauge 2 to be received inside the casing 1, and then the screw rod 211 of the gauge 2 is fastened to the related instrument. Before inserting the stem 21 through the through hole 12, the rivet-like rubber gasket 5 is fitted into the through hole 12 with its head stopped on the inside, and the metal gasket 4 is mounted on the head of the rivet-like rubber gasket 5. After the stem 21 has been inserted through the metal gasket 4, the rivet-like rubber gasket 5, and the through hole 12 on the casing 1, the metal gasket 4 is pressed by the gauge 2 to squeeze the rivet-like rubber gasket 5, thereby causing it to tightly engage with the inside wall 121 of the through hole 12. Because the rivet-like rubber gasket 5 and the metal gasket 5 are mounted on the plane 11 of the casing 1, the head of the rivet-like rubber gasket 5 is simultaneously forced to tightly engage with the inside surface of the plane 11 of the casing. Therefore, the gap between the stem 21 and the periphery of the through hole 12 is completely sealed.

After the gauge 2 has been fastened to the casing 1, the transparent cover 3 is covered on the casing 1 over the gauge 2, and the gauge 2 is then fixed to the casing 1 by tie screws 6. The tie screw 6 has an annular groove 62 with chamfered edge 61 on the bottom of the head around the shank, on which a plastic gasket 63 is directly molded. Therefore, turning tight the tie screw 6 causes the plastic gasket 63 to seal the gap.

As indicated, the gap between the stem 21 and the casing 1 is sealed by the rivet-like rubber gasket 5, and the gap between either tie screw 6 and the casing 1 is sealed by the respective plastic gasket 63.

What is claimed is:

1. An oil-filled pressure gauge leak-stoppage device comprising a casing, a gauge received inside casing, said gauge having a stem extended out of said casing through an axle hole on a vertical peripheral wall thereof, a transparent covering on said casing, an oil filled inside said casing, and tie screws respectively threaded through holes on said casing into screw holes on said gauge to fix said gauge in place, first sealing means to seal the gap between said stem and said casing, and second sealing means to seal the gaps between said tie screws and said casing, wherein said axle hole is made on a plane on said vertical peripheral wall of said casing; said first sealing means comprises a rivet-like rubber gasket and a metal gasket, said rivet-like rubber gasket having a tubular body fitted into said axle hole and a head stopped at said plane inside said casing, said metal gasket being retained between said rivet-like rubber gasket and said gauge; said second sealing means comprises a plurality of plastic gaskets respectively and directly molded on a chamfered annular groove on the bottom of the head of either tie screw around its shank.

* * * * *